United States Patent [19]

Dole et al.

[11] Patent Number: 5,100,598
[45] Date of Patent: Mar. 31, 1992

[54] METHOD OF FORMING YTTRIA-GADOLINIA CERAMIC SCINTILLATOR FROM AMMONIUM DISPERSED OXALATE PRECIPITATES

[75] Inventors: Stephen L. Dole, Burnt Hills; Charles D. Greskovich, Schenectady, both of N.Y.

[73] Assignee: General Electric Company, Schenectady, N.Y.

[21] Appl. No.: 657,032

[22] Filed: Feb. 19, 1991

[51] Int. Cl.$^5$ .............................. C04B 35/50
[52] U.S. Cl. ........................ 264/65; 264/1.2; 252/301.4 R
[58] Field of Search ................. 264/1.2, 65; 252/301.4 R

[56] References Cited

U.S. PATENT DOCUMENTS 4,755,492 7/1988 Greskovich .................. 264/1.2
5,021,376 6/1991 Nienburg ........................ 264/86

Primary Examiner—James Derrington
Attorney, Agent, or Firm—James E. McGinness; James C. Davis, Jr.; James Magee, Jr.

[57] ABSTRACT

A simplified method of forming polycrystalline translucent-to-transparent yttria-gadolinia scintillators comprises coprecipitating oxalates of the yttria-gadolinia composition, drying the oxalates at about 75° C. to 125° C., forming an aqueous suspension of the dried oxalates, and agitating the suspension while admixing an effective amount of an ammonium hydroxide solution to disperse agglomerations of the oxalate coprecipitates. The dispersed oxalates are calcined to substantially fully oxidize the oxalates and form an oxide powder of the yttria-gadolinia composition. The oxide powder is cold pressed to form a compact, and the compact is sintered in a reducing atmosphere or vacuum to form the polycrystalline translucent-to-transparent yttria-gadolinia scintillator.

10 Claims, No Drawings

METHOD OF FORMING YTTRIA-GADOLINIA CERAMIC SCINTILLATOR FROM AMMONIUM DISPERSED OXALATE PRECIPITATES

This application is related to application Ser. No. 07/660,462, filed Feb. 26, 1991.

The present invention is related to a method of forming rare earth oxide ceramic scintillators for computerized tomography (CT) and other x-ray, gamma radiation, and nuclear radiation detecting applications. More specifically the method relates to forming polycrystalline translucent-to-transparent yttria-gadolinia scintillators.

BACKGROUND OF THE INVENTION

Computerized tomography scanners are medical diagnostic instruments in which the subject is exposed to a relatively planar beam or beams of x-ray radiation, the intensity of which varies in direct relationship to the energy absorption along a plurality of subject body paths. By measuring the x-ray intensity (i.e., the x-ray absorption) along these paths from a plurality of different angles or views, an x-ray absorption coefficient can be computed for various areas in any plane of the body through which the radiation passes. These areas typically comprise approximately a square portion of about 1 mm × 1 mm. The absorption coefficients are used to produce a display of, for example, the bodily organs or structural members of industrial equipment intersected by the x-ray beam.

An integral and important part of the scanner is the x-ray detector which receives the x-ray radiation which has been modulated by passage through the particular body under study. Generally, the x-ray detector contains a scintillator material which, when excited by the impinging x-ray radiation, emits optical wavelength radiation. In typical medical or industrial applications, the optical output from the scintillator material is made to impinge upon photoelectrically responsive materials in order to produce electrical output signals, the amplitude of which is directly related to the intensity of the impinging x-ray radiation. The electrical signals are digitized for processing by digital computer means which generates the absorption coefficients in a form suitable for display on a cathode ray tube screen or other permanent media.

Due to the specific and demanding computerized tomography requirements, not all scintillator materials which emit optical radiation upon excitation by x-ray or gamma ray radiation are suitable for computerized tomography applications. Useful scintillators must be efficient converters of x-ray radiation into optical radiation in those regions of the electromagnetic spectrum (visible and near visible) which are most efficiently detected by photosensors such as photomultipliers or photodiodes. It is also desirable that the scintillator have a high optical clarity, i.e., transmit the optical radiation efficiently to avoid optical trapping, such that optical radiation originating deep in the scintillator body escapes for detection by externally situated photodetectors. This is particularly important in medical diagnostic applications where it is desirable that x-ray dosage be as small as possible to minimize patient exposure, while maintaining adequate quantum detection efficiency and a high signal-to-noise ratio.

Among other desirable scintillator material properties are short afterglow or persistence, low hysteresis, high x-ray stopping power, and spectral linearity. Afterglow is the tendency of the scintillator to continue emitting optical radiation for a time after termination of x-ray excitation, resulting in blurring, with time, of the information-bearing signal. Short afterglow is highly desirable in applications requiring rapid sequential scanning such as, for example, in imaging moving bodily organs. Hysteresis is the scintillator material property whereby the optical output varies for identical x-ray excitation based on the radiation history of the scintillator. Hysteresis is undesirable due to the requirement in computerized tomography for repeated precise measurements of optical output from each scintillator cell and where the optical output must be substantially identical for identical x-ray radiation exposure impinging on the scintillator body. Typical detecting accuracies are on the order of one part in one thousand for a number of successive measurements taken at relatively high rate. High x-ray stopping power is desirable for efficient x-ray detection. X-rays not absorbed by the scintillator escape detection. Spectral linearity is another important scintillator material property because x-rays impinging thereon have different frequencies. Scintillator response must be substantially uniform at all x-ray frequencies.

Compositions and methods of forming polycrystalline, rare earth oxide, ceramic scintillators having high optical clarity, density, uniformity, cubic structure, and useful in computerized tomography scanners, are disclosed in U.S. Pat. Nos. 4,421,671, 4,518,545, 4,525,628, 4,466,929, 4,466,930, and 4,747,973, incorporated herein by reference. Briefly described, the polycrystalline ceramic scintillators are formed of a rare earth oxide selected from the group consisting of $Gd_2O_3$, $Y_2O_3$, $La_2O_3$, $Lu_2O_3$, and mixtures thereof that form a cubic crystal structure. The rare earth oxide is doped with a rare earth activator such as europium, neodymium, ytterbium, dysprosium, terbium, and praseodymium to form the cubic crystal structure which scintillates at a predetermined wave length. Optionally, transparency promoters such as $ThO_2$, $ZrO_2$, and $Ta_2O_5$ can be added in an amount sufficient to improve the transparency of the ceramic scintillator, and a light output restorer such as CaO or SrO in an amount sufficient to effect a higher light output.

An important step in forming the rare earth oxide ceramic scintillators is the preparation of a suitable powder containing the desired scintillator material constituents. Suitable powders have submicron-to-micron powder particles, and are, for example, 99.99% to 99.9999% pure. Powder particle size is submicron-to-micron to provide high optical clarity, larger particle size results in higher porosity and loss of optical clarity when the powder is sintered to form the scintillator body. A known method for forming the desired starting powder employs a wet chemical oxalate precipitation process. The selected molar percentages of the nitrates of yttrium, gadolinium, europium, niobium, ytterbium, dysprosium, terbium, and praseodymium, are dissolved in water. The aqueous nitrate solution of the desired scintillator material constituents is admixed with a solution of oxalic acid which is, for example, 80% saturated at room temperature. The resulting coprecipitated oxalates are washed, neutralized, filtered, and dryed in air at about 100° C. for approximately 8 hours. The oxalates are then calcined, thermally decomposed, in air at approximately 700° C. to about 900° C. for a time ranging from one to four hours to form the corresponding oxides. Typically, heating for one hour at 800° C. is sufficient. Preferably, the oxalates or the resulting oxides are milled by one of several methods such as ball, colloid, or fluid energy milling to enhance optical clarity when the powder is sintered to form the scintillator.

Selected amounts of the powder composition are formed into powder compacts by either die pressing, or die pressing followed by isostatic pressing to further increase green density. The compact is densified by sintering, sintering plus gas hot isostatic pressing, or ceramic hot pressing methods. In the known methods for forming the rare earth ceramic scintillator materials described above, optical clarity is most improved in the sintered scintillators formed from milled oxalate or oxide powders.

It is an object of this invention to provide a simplified method for achieving high optical clarity in yttria-gadolinia ceramic scintillators without performing the step of milling the oxalate or oxide powders.

It is another object of this invention to form finely divided yttria-gadolinia ceramic scintillator powders by a wet chemical method where agglomerations of oxalate coprecipitates are dispersed with an ammonium hydroxide solution.

The terms "transparency" and "translucency", as used herein, describe various degrees of optical clarity in the scintillator material. Typically, the inventive scintillator materials exhibit an optical attenuation coefficient of less than 100 cm$^{-1}$, as measured by standard spectral transmittance tests (i.e., "narrow" angle transmission) on a polished scintillator material plate, at the luminescent wavelength of the respective ion. The most desirable scintillator materials have lower attenuation coefficients and hence higher optical clarity, i.e., higher transparency.

BRIEF DESCRIPTION OF THE INVENTION

We have discovered a simplified method of forming high optical clarity yttria-gadolinia ceramic scintillators. The high optical clarity obtained in scintillators made by known methods using milled oxalate powders, is obtained in scintillators formed by the the method of this invention without the need for milling the oxalate powder.

The method of this invention for forming polycrystalline translucent to transparent yttria-gadolinia scintillators comprises coprecipitating oxalates of the yttria-gadolinia composition, and drying the oxalates at about 75° to 125° C. The particle size of the coprecipitates is reduced by forming an aqueous suspension of the dried oxalates, and agitating the suspension while admixing an effective amount of an ammonium hydroxide solution to disperse agglomerations of the oxalate coprecipitates. Preferably, the ammonium hydroxide solution increases the pH of the mixture to about 8 to 10. The dispersed oxalates are calcined to substantially fully oxidize the oxalates and form an oxide powder of the yttria-gadolinia composition. The oxide powder is cold pressed to form a compact, and the compact is sintered in a reducing atmosphere or vacuum to form the polycrystalline translucent-to-transparent yttria-gadolinia scintillator.

DETAILED DESCRIPTION OF THE INVENTION

We have discovered that by dispersing oxalate coprecipitates of the yttria-gadolinia composition with an ammonium hydroxide solution, a more finely divided coprecipitated oxalate is produced as compared to the oxalate coprecipitates formed by known methods. The finely divided oxalate coprecipitates are calcined to form a finely divided oxide powder that sinters to a high optical clarity, comparable to the optical clarity of yttria-gadolinia scintillators formed from milled oxalate or oxide powders in prior known methods. As a result, the higher optical clarity yttria-gadolinia scintillators can be formed without the need of milling oxalate or oxide powders prior to calcining or sintering respectively.

The yttria-gadolinia composition scintillators of this invention are comprised of oxides of yttrium and gadolinium, and trivalent rare earth activator oxides. More specifically, the yttria-gadolinia composition scintillators are comprised of, in mole percent; about 5 to 50 percent $Gd_2O_3$, about 0.02 to 12 percent of a rare earth activator such as europium, neodymium, ytterbium, dysprosium, terbium, and praseodymium, and the remainder $Y_2O_3$. Materials containing less than about 5 mole percent $Gd_2O_3$ exhibit low x-ray stopping power for most practical detector design, while materials having more than 50 mole percent are increasingly non-cubic and exhibit poor optical clarity. The oxides of trivalent rare earth elements such as europium, neodymium, ytterbium, dysprosium, terbium, and praseodymium, are added to the basic yttria-gadolinia system as activators to enhance scintillator efficiency. Although not meant to be a complete list, examples of preferred compositions of the yttria-gadolinia composition scintillators are as follows: about 25 to 30 mole percent $Gd_2O_3$, about 1 to 6 mole percent $Eu_2O_3$, and the remainder $Y_2O_3$; about 30 mole percent $Gd_2O_3$, about 0.25 mole percent $Nb_2O_3$, and the remainder $Y_2O_3$; about 40 mole percent $Gd_2O_3$, about 0.15 mole percent $Tb_2O_3$, and the remainder $Y_2O_3$; about 40 mole percent $Gd_2O_3$, about 0.2 mole percent $Dy_2O_3$, and the remainder $Y_2O_3$.

The yttria-gadolinia compositions described above provide a cubic crystalline phase characterized by a high degree of scintillator material structural symmetry. Materials having such structure are particularly desirable for CT applications. Scintillator materials having increasing amounts of non-cubic phase, such as monoclinic phase, are characterized by lower relative light outputs and poor optical clarity due to grain boundary cracking and non-uniform crystalline structure. Materials having such non-cubic structure exhibit appreciable light scattering and reabsorbtion due to a longer effective relative path length for light transmission, thereby decreasing the amount of light available for detection by external photosensors.

Certain additives are useful in the yttria-gadolinia scintillator system to reduce undesirable scintillator material luminescent afterglow, which may lead to undesirable distortion and the presence of artifacts in reconstructed images. Additions of about 0.15 to 0.7 mole percent $Yb_2O_3$, about 0.1 to 2 mole percent SrO, and about 0.1 to 2 mole percent CaO are useful as an afterglow reducer. Powders of the aforedescribed yttria-gadolinia composition scintillators may be formed into scintillators by sintering, sintering plus hot isostatic pressing, and ceramic hot pressing methods. However, prior to the fabrication of the ceramic scintillator a suitable powder containing the desired scintillator material constituents must be formed.

In the method of this invention, finely divided oxide powders of the yttria-gadolinia scintillators are prepared by wet chemical methods, without the need for milling to reduce powder particle size. In an oxalate coprecipitation process, the selected molar percentages of nitrates or chlorides of yttrium, gadolinium, europium, neodymium, ytterbium, dysprosium, terbium, praseodymium, and strontium, are dissolved in water, or, the respective oxides are dissolved in an aqueous nitric or hydrochloric acid solution, to form a dissolved rare earth solution. Preferably, the dissolved rare earth solution is filtered to remove insoluble matter, and diluted to a 0.1 to 0.2 molar aqueous rare earth solution.

An oxalic acid solution which is, for example, 80 percent saturated at room temperature is agitated while gradually adding the aqueous rare earth solution to form the respective coprecipitated oxalates. Agitation can be by any suitable non-contaminating means such as magnetic stirring, fluid turbulence mixing, or mechanical vibration. Preferably, the resulting coprecipitated oxalates are washed, neutralized, and filtered, to remove excess oxalic acid. The oxalates are filtered to remove excess water, and dried for several hours in air at about 75° to 125° C. Such drying forms a friable cake that can be granulated by pushing the friable cake through a mesh nylon screen, for example, about 20 mesh.

We have discovered that the oxalate powder particle size can be further refined by agitating an aqueous suspension of the oxalates while admixing an effective amount of the ammonium hydroxide solution to disperse agglomerations of the oxalate coprecipitates. The ammonium hydroxide solution is an aqueous solution of ammonium hydroxide, or an ammonium hydroxide compound such as tetramethyl ammonium hydroxide, that preferably, raises the pH of the aqueous oxalate suspension to about 8 to 10. More preferably, the ammonium hydroxide solution comprises ammonium hydroxide at a concentration sufficient to raise the pH of the aqueous oxalate suspension to about 9.5. It was found that agitation for about 30 minutes is sufficient to cause dispersion of oxalate agglomerations. Agitation can be by any suitable means that does not contaminate the oxalates, for example, magnetic stirring, ultrasonic agitation, or mechanical vibration, i.e., shaking.

Preferably, the aqueous suspension of dispersed oxalates is filtered and washed to remove excess ammonium hydroxide. Washing and filtering is aided by settling the suspension of oxalate coprecipitates in the aqueous suspension, for example, by adding an oxalic acid solution to the ammonium hydroxide solution, and continuing stirring until the coprecipitates begin to settle. The aqueous solution can be decanted from the settled oxalates and fresh water added to wash the oxalates and repeat the decanting operation. The washed oxalates are filtered, dried at about 75° to 125° C., and granulated as described above.

The ammonium hydroxide conditioning of the oxalate coprecipitates provides a reduced particle size in the dried oxalate powder. The particle size of the yttria-gadolinia powder formed by the method of this invention approaches the size achieved after milling in the prior known methods. For example, an oxalate particle size of 5 microns or less can be formed by performing the dispersion with the ammonium hydroxide solution. As a result, milling is not required to achieve a comparable high optical clarity in sintered scintillators formed from powder produced by the method of this invention. However, milling and screening of the oxalates can be performed in the method of this invention to achieve further improved optical clarity in the sintered scintillators. For example, improved optical clarity is achieved by dry or wet screening of oxalate powders through fine mesh, for example 100 to 325 mesh, nylon screens. Milling is preferably of the type that does not contaminate the oxalate or oxide powders. For example, jet air milling, or high energy vibration milling with a rigid organic polymer milling media, or a metallic milling media such as steel balls coated with the rigid organic polymer. A suitable rigid organic polymer milling media has a hardness of about 40 Shore scale D Durometer hardness or greater, for example organic polymers such as polyamides including nylon, polyethylenes, acetyls, and polyesters.

The oxalate powder is calcined in air, i.e., thermally decomposed, at approximately 700° C. to about 900° C. for a time ranging from 1 to 4 hours to form the corresponding oxides. Typically, heating for 1 hour at 800° C. is sufficient. The oxide powder is formed into a compact by either die pressing or die pressing followed by isostatic pressing to further increase green density. A die material which is inert with respect to the scintillator constituents is preferred to avoid undesired reactions and contaminations. Suitable die materials include alumina, silicon carbide, and metals such as molybdenum, hardened steel, or nickel-based alloys. The powder compacts are formed by die pressing at pressures between about 3000 pounds per square inch, psi., and 15,000 psi. Alternatively, the die pressed powder compacts may be isostatically pressed at between 10,000 psi. and 60,000 psi. to further increase powder compact green density. If any grinding aids, compaction aids, or lubricants such as waxes, have been used, an oxidation treatment to remove all organic additives can be employed prior to sintering. The compacts are sintered in a high temperature furnace, for example having a tungsten heating element, in vacuum or a reducing atmosphere such as a wet hydrogen atmosphere, dew point of about 23° C. The compact is heated at a rate between approximately 100° C. per hour to 700° C. per hour to the sintering temperature of between 1800° C. and 2100° C., and held at the sintering temperature for about 1 to 30 hours to cause extensive densification and optical clarity development. After sintering, the compacts are cooled to room temperature over a period of time ranging from about 2 to 10 hours.

Sintered ceramic scintillators may also be prepared by a heating sequence which includes a hold at a temperature lower than the final sintering temperature. Typically, the powder compact is heated at a rate of between 300° C. and 400° C. per hour to a holding temperature of between 1600° C. and 1700° C. The holding period may range from about 1 to 20 hours, following which the temperature is raised to between about 1800° C. and 2100° C. for final sintering for between 1 and 10 hours. The increase from the holding temperature to the final sintering temperature is at a rate of about 25° C. to 75° C. per hour. A preferred heating sequence comprises heating the powder compact to a holding temperature of about 1700° C. in 5 hours, holding at 1700° C. for 8 hours, followed by heating to 1910° C. in 4 hours, and sintering at 1910° C. for 2 hours.

The various features and advantages of the method of this invention are further shown by the following Examples.

EXAMPLE 1

A dissolved oxide solution comprised of about 50 grams of mixed oxides of about 67 mole percent yttrium oxide, 30 mole percent gadolinium oxide, and 3 mole percent europium oxide was formed by dissolving the oxides in about 200 grams of nitric acid and water to a final solution volume of 500 milliliters. The dissolved oxide solution was filtered and diluted to 3 liters with distilled water. An oxalic acid solution comprised of 167 grams of oxalic acid dissolved in 3 liters of distilled water was stirred while slowly adding the dissolved oxide solution to form coprecipitates of the respective oxalates. The oxalate coprecipitate suspension was stirred until precipitation was complete, about 1 minute, and washed by stirring with about 16 liters of distilled water, allowing the oxalates to settle, and decanting the water. The washing and decanting procedure was repeated eight times, increasing the pH of the decanted water to about 5.5, within about 10 percent of the pH of the distilled water. The washed oxalate coprecipitates were filtered to remove the liquid, dried several hours at 105° C. in air to form a friable cake, and granulated by pushing the cake through a 20 mesh nylon screen.

An ammonium hydroxide solution dispersion step was performed as follows. An aqueous oxalate suspension of about 50 grams of the dried oxalate powder in 150 milliliters of distilled water was formed. The aqueous oxalate suspension was stirred while admixing an ammonium hydroxide solution, about 1.5 molar ammonium hydroxide, until the pH of the mixture was increased to about 9.5. The mixture was stirred for about 30 minutes, and an oxalic acid solution of 1.8 grams oxalic acid in 30 milliliters of distilled water was stirred into the mixture, reducing the pH to about 3.0. The mixture was stirred for another minute and filtered to remove the liquid. The oxalate coprecipitates were washed by filtering an additional 2.5 liters of water through the oxalates. The washed oxalate coprecipitates were dried and granulated as described above.

The dried oxalate powder was calcined at 825° C. for 2 hours in air to form the corresponding oxide powder. The oxide powder was pressed in a steel die to form a pellet, and the pellet was isostatically pressed at 60,000 psi. The pressed pellet was fired in a flowing wet hydrogen atmosphere in a furnace equipped with a tungsten heating element with the following heating schedule: heat to 1700° C. in 5 hours, hold at 1700° C. for 8 hours, heat to 1910° C. in 4 hours, and hold at 1910° C. for 2 hours to sinter the pellet. The sintered pellet was cooled to room temperature in about 2 hours. The optical transparency of the sintered pellet was measured in an in-line transmission test, for visible light, and had an in-line transmission of 47 percent for 1 millimeter thickness, and an attenuation coefficient of 5.5 inverse centimeters.

EXAMPLE 2

A pellet of the yttria-gadolinia composition scintillator was formed according to the method in Example 1, but the ammonium hydroxide solution dispersion step was omitted. The optical clarity was measured and found to have less than 0.1 percent in-line transmission for 1 millimeter thickness, and an attenuation coefficient of about 70 inverse centimeters.

EXAMPLE 3

An aqueous oxalate coprecipitate suspension was formed according to the procedure in Example 1. An ammonium hydroxide solution was added to the oxalate suspension until the mixture pH was 8.0, and the mixture was stirred for 30 minutes. An oxalic acid solution was added to the mixture as in Example 1 to settle the oxalates. The ammonium hydroxide conditioned oxalates were filtered to remove the liquid, and the oxalate coprecipitates were washed with 4 liters of distilled water to remove excess ammonium hydroxide, and filtered to remove the liquid. The washed oxalate coprecipitates were dried and sintered according to the process described in Example 1 to form a sintered pellet. The sintered pellet was measured to have an in-line transmission of about 47 percent for 1 millimeter thickness, and an attenuation coefficient of about 5.5 inverse centimeters.

EXAMPLE 4

An aqueous oxalate coprecipitate suspension was formed according to the procedure in Example 1. An ammonium hydroxide solution was added to the oxalate suspension until the mixture pH was 10.0, and the mixture was stirred for 30 minutes. The ammonium hydroxide dispersed oxalate suspension was filtered to remove the liquid, washed with 4 liters of distilled water to remove excess ammonium hydroxide, and filtered to remove the liquid. The washed oxalate coprecipitates were dried, pressed, and sintered according to the process described in Example 1 to form a sintered pellet. The sintered pellet was measured to have an in-line transmission of 49 percent for 1 millimeter thickness, and an attenuation coefficient of 5.0 inverse centimeters.

EXAMPLE 5

An oxalate powder prepared as described in Example 1 was additionally processed by dry screening the oxalate powder through a 100 mesh nylon screen. The screened powder was dried, calcined, and sintered according to the process in Example 1. The sintered pellet had an in-line transmission of 55 percent for 1 millimeter thickness, and an attenuation coefficient of 3.9 inverse centimeters.

EXAMPLE 6

An oxalate powder prepared as described above in Example 1 was additionally processed by wet screening the oxalate powder through a 325 mesh nylon screen. The screened powder was dried, calcined, and sintered according to the process in Example 1. The sintered pellet had an in-line transmission of 58 percent for 1 millimeter thickness, and an attenuation coefficient of 3.3 inverse centimeters.

We claim:

1. A method of forming a polycrystalline translucent-to-transparent yttria-gadolinia composition scintillator that does not require milling comprising:
   coprecipitating oxalates of the yttria-gadolinia composition;
   drying the oxalates at about 75° to 125° C.;
   dispersing the oxalates by agitating an admixture of an aqueous suspension of the oxalates, and an effective amount of an ammonium hydroxide solution to disperse agglomerations of the oxalates;
   calcining the oxalates to substantially fully oxidize the oxalates and form a powder of the yttria-gadolinia composition;
   cold pressing the powder to form a compact; and
   sintering the compact in a reducing atmosphere or vacuum to form the polycrystalline translucent-to-transparent yttria-gadolinia scintillator.

2. The method of claim 1 wherein the step of coprecipitating oxalates comprises admixing an aqueous nitrate or chloride solution of the yttria-gadolinia composition, with an aqueous oxalic acid solution in an effective amount to coprecipitate the oxalates.

3. The method of claim 2 wherein an effective amount of ammonium hydroxide solution raises the mixture pH to about 8 to 10.

4. The method of claim 3 wherein the agitating is for about 15 to 45 minutes.

5. The method of claim 4 wherein the dispersed oxalates are washed to remove excess ammonium hydroxide.

6. The method of claim 5 further comprising the step of settling the dispersed oxalates by adding an effective amount of oxalic acid.

7. The method of claim 1 wherein the step of calcining is preceded by the step of milling or screening the oxalates.

8. The method of claim 6 wherein the step of calcining is preceded by the step of milling or screening the oxalates.

9. The method of claim 7 wherein the milling is vibration milling with a rigid organic polymer milling media.

10. The method of claim 8 wherein the milling is vibration milling with a rigid organic polymer milling media.

* * * * *